(12) United States Patent
Yamamoto

(10) Patent No.: US 10,715,051 B2
(45) Date of Patent: Jul. 14, 2020

(54) RESONANT POWER CONVERSION DEVICE INCLUDING AN ADJUSTMENT AMOUNT CALCULATOR

(71) Applicant: Mitsubishi Electric Corporation, Tokyo (JP)

(72) Inventor: Takeshi Yamamoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/317,893

(22) PCT Filed: Jul. 26, 2016

(86) PCT No.: PCT/JP2016/071834
§ 371 (c)(1),
(2) Date: Jan. 15, 2019

(87) PCT Pub. No.: WO2018/020570
PCT Pub. Date: Feb. 1, 2018

(65) Prior Publication Data
US 2020/0177084 A1    Jun. 4, 2020

(51) Int. Cl.
*H02M 3/337* (2006.01)
*H02M 7/538* (2007.01)
(Continued)

(52) U.S. Cl.
CPC ..... *H02M 3/3376* (2013.01); *H02M 3/33507* (2013.01); *H02M 7/538* (2013.01);
(Continued)

(58) Field of Classification Search
CPC ............... H02M 3/337; H02M 3/3376; H02M 3/33507; H02M 7/538; H02M 2001/0077; H02M 2001/0058
See application file for complete search history.

(56) References Cited

U.S. PATENT DOCUMENTS

| | | | |
|---|---|---|---|
| 7,746,671 B2 * | 6/2010 | Radecker .......... | H02M 3/33507 323/244 |
| 8,779,700 B1 * | 7/2014 | Prodic .................. | H02J 7/0014 318/139 |

(Continued)

FOREIGN PATENT DOCUMENTS

| | | |
|---|---|---|
| CN | 1402419 A | 3/2003 |
| CN | 101471606 A | 7/2009 |

(Continued)

OTHER PUBLICATIONS

International Search Report (PCT/ISA/210) dated Oct. 11, 2016, by the Japan Patent Office as the International Searching Authority for International Application No. PCT/JP2016/071834. (3 pages).

(Continued)

*Primary Examiner* — Yusef A Ahmed
*Assistant Examiner* — Shahzeb K Ahmad
(74) *Attorney, Agent, or Firm* — Buchanan Ingersoll & Rooney PC

(57) ABSTRACT

A resonant power conversion device includes: series-connected filter capacitors disposed at an input side and transformers, a power conversion circuit disposed between a primary side of the transformer and the filter capacitor, and a power conversion circuit disposed between a primary side of the transformer and the filter capacitor. The resonant power conversion device further includes: an adjustment amount calculator for calculating an adjustment amount indicating a delay time of a rise of a pulse of a control signal to a switching element or a switching element in accordance with a voltage difference between the filter capacitors; and a controller for, in accordance with the adjustment amount, causing a delay in the rise of the pulse of the control signal to the switching element or the switching element, and (Continued)

outputting the rise-delayed control signal to the switching elements.

8 Claims, 9 Drawing Sheets

(51) Int. Cl.
    *H02M 3/335*     (2006.01)
    *H02M 1/00*     (2006.01)

(52) U.S. Cl.
    CPC ............ *H02M 2001/0058* (2013.01); *H02M 2001/0077* (2013.01)

(56) References Cited

U.S. PATENT DOCUMENTS

| | | | |
|---|---|---|---|
| 9,806,621 B1* | 10/2017 | Babazadeh | H02M 3/1584 |
| 2003/0035305 A1 | 2/2003 | Arai et al. | |
| 2004/0037092 A1* | 2/2004 | Kurio | H02M 3/3376 363/17 |
| 2014/0268889 A1 | 9/2014 | Scott et al. | |
| 2015/0229225 A1* | 8/2015 | Jang | H02M 3/285 363/17 |

FOREIGN PATENT DOCUMENTS

| | | |
|---|---|---|
| CN | 203775033 U | 8/2014 |
| JP | 62-210861 A | 9/1987 |
| JP | 01-283057 A | 11/1989 |
| JP | 2004-088814 A | 3/2004 |
| JP | 2008-099381 A | 4/2008 |
| JP | 2010-193614 A | 9/2010 |
| JP | 2013-132175 A | 7/2013 |
| WO | 2015/162732 A1 | 10/2015 |

OTHER PUBLICATIONS

Japanese Office Action (Notification of Reasons for Refusal) dated Jul. 25, 2017, issued for the corresponding JP patent application No. 2017-533642, and a English Translation thereof. (8 pages).

Japanese Office Action (Notification of Reasons for Refusal) dated Oct. 17, 2017, issued for the corresponding JP patent application No. 2017-533642, and a English Translation thereof. (9 pages).

Written Opinion (PCT/ISA/237) dated Oct. 11, 2016, by the Japan Patent Office as the International Searching Authority for International Application No. PCT/JP2016/071834. (5 pages).

Chinese Office Action dated Mar. 30, 2020 issued in Chinese Patent Application No. 201680087793.2, with English translation (16 pages).

* cited by examiner

RESONANT POWER CONVERSION DEVICE INCLUDING AN ADJUSTMENT AMOUNT CALCULATOR

TECHNICAL FIELD

The present disclosure relates to a resonant power conversion device that includes a resonant circuit.

BACKGROUND ART

A power conversion device includes a plurality of filter capacitors connected in series and arranged at an input side, a plurality of transformers in one-to-one correspondence with the plurality of filter capacitors, and a plurality of power conversion circuits in one-to-one correspondence with the plurality of filter capacitors, using as an input voltage a voltage applied to the filter capacitors, converting a direct current voltage to an alternating current voltage, and outputting the alternating current voltage to an primary side of transformers. Differences may occur in the output voltages of the power conversion circuits. Due to the differences in the output voltages of the power conversion circuits, an output current of the power conversion device may increase and decrease, and overcurrent may occur.

A power supply device for applications such as arc welding, as disclosed in Patent Literature 1, suppresses imbalances between terminal voltages of input-side filter capacitors caused by output imbalances of inverters arranged at a primary side of transformers, conduction width imbalances of switching elements of the inverters, or the like. Specifically, in this power supply device, for each filter capacitor voltage between terminals is detected, a differential voltage is detected relative to a reference signal, and pulse timing is corrected so as to become narrow along the time axis when the voltage between terminals is low.

In a DC-DC converter disclosed in Patent Literature 2, unitary units are provided in n groups for a direct current power supply, each of the unitary units having a pair of transformers and a pair of conversion circuit units. In addition to connecting in series between the n groups a secondary side of one of the transformers occurring in the unitary unit, by connection of a secondary side of the other transformer in the unitary unit in series between the n groups, increase or decrease of an output current of the power conversion device is suppressed.

CITATION LIST

Patent Literature

Patent Literature 1: Unexamined Japanese Patent Application Kokai Publication No. 2008-99381
Patent Literature 2: Unexamined Japanese Patent Application Kokai Publication No. 2004-88814

SUMMARY OF INVENTION

Technical Problem

When the secondary sides of the transformers are connected in series to simplify the configuration of the power conversion device, differences may occur in the voltages of the filter capacitors due to differences in leakage inductances due to variance between the transformer elements. When pulses of the same width are applied at the same timing to the switching elements in the state in which differences occur in the voltages of the filter capacitors, differences occur in losses of the switching elements. In the case in which the power conversion device is mounted on an electric railway vehicle, the input voltage is a high voltage of about 1,000V. As the input voltage increases, differences increase in the losses of the switching elements caused by the voltage differences between the filter capacitors, and differences increase in the life spans of the switching elements. Although arranging resistances in parallel with the filter capacitors in order to decease the voltage differences between the filter capacitors is considered, when a input voltage is a high voltage in the aforementioned manner, value of the resistance is required to be of the order of milliohms, and the amount of heat generated by the resistance increases. Size of a heatsink is required to increase with the amount of heat generated, and thus manufacturing cost increases, and space occupied by the resistance in the power conversion device increases.

In consideration of the aforementioned circumstances, an objective of the present disclosure is to lower voltage differences of the filter capacitors connected in series and arranged at the input side of the power conversion device for which transformers are connected in series at the secondary side.

Solution to Problem

In order to attain the aforementioned objective, a resonant power conversion device of the present disclosure includes: a plurality of filter capacitors connected in series and disposed at an input side; a plurality of transformers in one-to-one correspondence with the plurality of filter capacitors, the transformers being connected in series at a secondary side; a plurality of power conversion circuits in one-to-one correspondence with the plurality of filter capacitors; a controller; and an adjustment amount calculator. Each power conversion circuit of the power conversion circuits has a resonant capacitor and a switching element. The power conversion circuits input as an input voltage a voltage applied to the filter capacitors, converts direct current voltage to alternating current voltage, and outputs the alternating current voltage at a primary side of the transformers. The controller switches the switching element on or off by outputting a control signal that is a pulse signal to the switching element. The adjustment amount calculator calculates, in accordance with a voltage difference of the filter capacitors, an adjustment amount indicating a delay time of a rise of a pulse of the control signal to the switching element of some of the power conversion circuits. The voltage difference of the filter capacitors is a difference in voltage values of the filter capacitors detected by a voltage detector, the difference occurring due to a lack of matching of mutual inductances of the transformers connected in series at secondary sides. The controller delays, in accordance with the adjustment amount, the rise of the pulse of the control signal to the some of the switching elements included in the power conversion circuits.

Advantageous Effects of Invention

According to the present disclosure, the rise of the pulse of the control signal to the switching element of the power conversion circuit is delayed in accordance with the voltage difference of the filter capacitors, thereby enabling decrease of the voltage difference of the filter capacitors.

DESCRIPTION OF EMBODIMENTS

Figure 1:
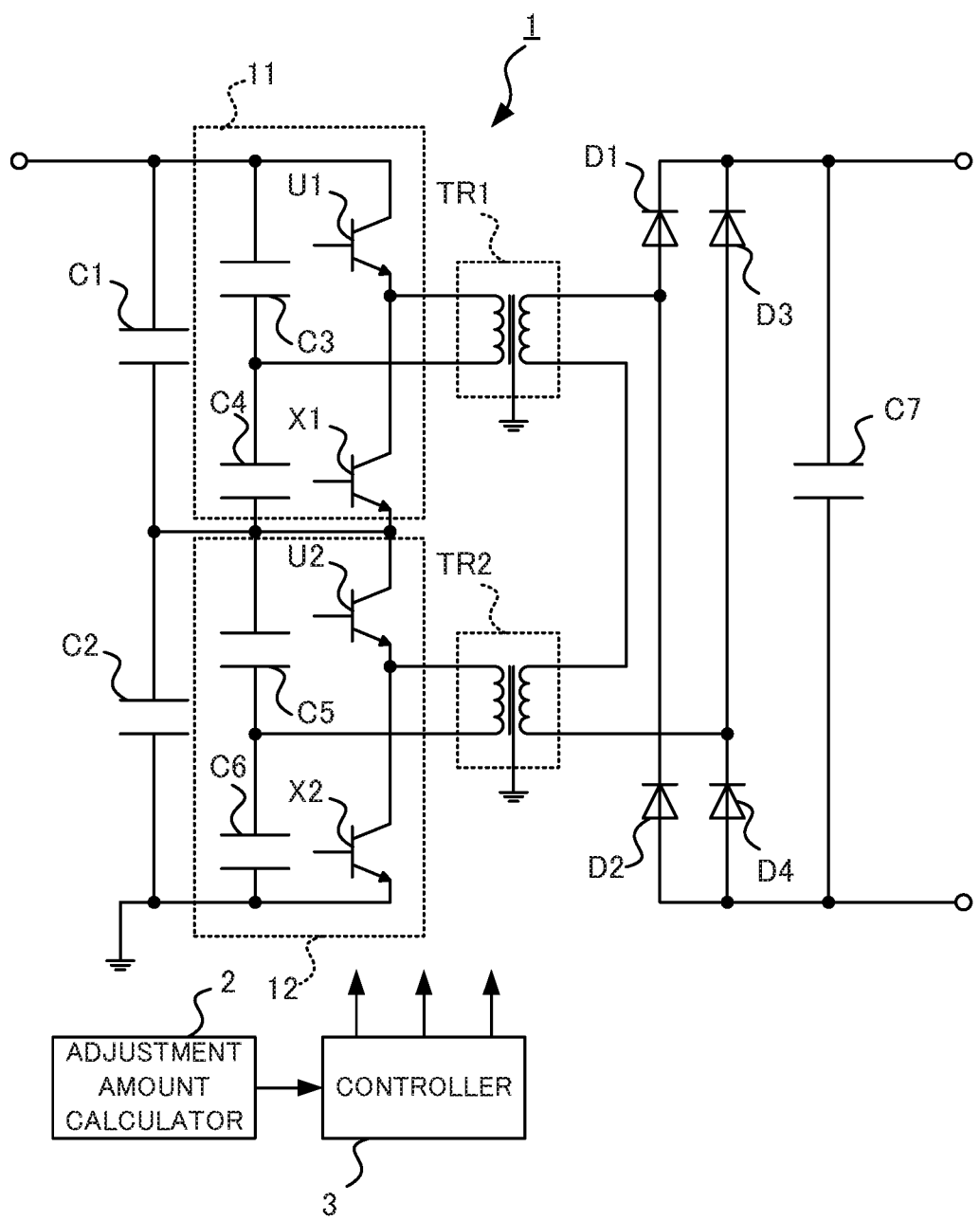
FIG. 1 is a block diagram illustrating an example configuration of a resonant power conversion device according to an embodiment of the present disclosure.

Embodiments of the present disclosure are described below in detail with reference to drawings. In the drawings, components that are the same or equivalent are assigned the same reference signs.

FIG. 1 is a block diagram illustrating an example configuration of a resonant power conversion device according to an embodiment of the present disclosure. In the example of FIG. 1, a resonant power conversion device 1 is a resonant-type inverter device. The resonant power conversion device 1 is equipped with: filter capacitors C1 and C2 that are connected in series and arranged at an input side, transformers TR1 and TR2 for which secondary sides are connected in series, a power conversion circuit 11 arranged between the filter capacitor C1 and the transformer TR1 primary side, and a power conversion circuit 12 arranged between the filter capacitor C2 and the transformer TR2 primary side. The secondary sides of the transformers TR1 and TR2 are connected in series. Due connection of the secondary sides of the transformers TR1 and TR2 in series, the circuit configuration arranged at the secondary sides of the transformers TR1 and TR2 is simplified. Series-connected diodes D1 and D2, series-connected diodes D3 and D4, and a filter capacitor C7 are mutually connected in parallel at the secondary sides of the transformers TR1 and TR2. The secondary sides of the transformers TR1 and TR2 are connected in series, and one end of the secondary side of the transformer TR1 is connected to a connection point of the diodes D1 and D2. One end of the secondary side of the transformer TR2 is connected to a connection point of the diodes D3 and D4.

The resonant power conversion device 1, as described below, is further equipped with: an adjustment amount calculator 2 for calculating an adjustment amount indicating a delay time of a rise of a pulse of a control signal to switching elements U1 and X1 included in a power conversion circuit 11 or switching elements U2 and X2 included in a power conversion circuit 12, in accordance with a voltage difference of the filter capacitors C1 and C2; and a controller 3 for outputting to the switching elements U1, X1, U2, and X2 the control signal after delaying of the rise of the pulse of the control signal with respect to the switching elements U1 and X1 or the switching elements U2 and X2, in response to the adjustment amount. Due to delaying of the rise of the pulse of the control signal to the switching elements U1 and X1 or the switching elements U2 and X2 in response to the adjustment amount, the resonant power conversion device 1 decreases the voltage difference of the filter capacitors C1 and C2.

In the example of FIG. 1, the power conversion circuits 11 and 12 are half-bridge circuits. The power conversion circuit 11 is equipped with series-connected resonant capacitors C3 and C4 and series-connected switching elements U1 and X1, and is connected in parallel to the filter capacitor C1. One end of the primary side of the transformer TR1 is connected to the connection point of the resonant capacitors C3 and C4, and the other end is connected to the connection point of the switching elements U1 and X1. The power conversion circuit 12 is equipped with series-connected resonant capacitors C5 and C6 and series-connected switching elements U2 and X2, and is connected in parallel to the filter capacitor C2. One end of the primary side of the transformer TR2 is connected to the connection point of the resonant capacitors C5 and C6, and the other end is connected to the connection point of the switching elements U2 and X2. The switching elements U1, X1, U2, and X2 are any freely selected switching element, and an example of such a switching element is an insulated gate bipolar transistor (IGBT).

In the switching elements U1 and X1, a sine half wave current flows that has a period $\tau_1$ determined by the capacitances of the resonant capacitors C3 and C4 and the primary-side leakage inductance of the transformer TR1. Taking respective capacitances of the resonant capacitors C3 and C4 to be "C3" and "C4", and taking the primary-side leakage inductance of the transformer TR1 to be L11, the period $\tau_1$ is expressed by Equation (1) below.

[Equation 1]

$$\tau_1 = 2\pi\sqrt{(C3+C4)\cdot L11} \qquad (1)$$

In the same manner, in the switching elements U2 and X2, a sine half wave current flows that has a period $\tau_2$ determined by the capacitances of the resonant capacitors C5 and C6 and the primary-side leakage inductance of the transformer TR2. Taking respective capacitances of the resonant capacitors C5 and C6 to be "C5" and "C6", and taking the primary-side leakage inductance of the transformer TR2 to be L21, the period $\tau_2$ is expressed by Equation (2) below.

[Equation 2]

$$\tau_2 = 2\pi\sqrt{(C5+C6)\cdot L21} \qquad (2)$$

In order to equalize losses in the switching elements U1, X1, U2, and X2, equalization of the aforementioned periods $\tau_1$ and $\tau_2$ is required. Thus matching the capacitances of the resonant capacitors C3, C4, C5, and C6 is required, and matching the primary-side leakage inductance L11 of the transformer TR1 and the primary-side leakage inductance L21 of the transformer TR2 is required.

However, due to product variance, the mutual inductance of the transformer TR1 and the mutual inductance of the transformer TR2 do not match. Thus the period $\tau_1$ and the period $\tau_2$ do not match. Further, due to lack of matching between the mutual inductance of the transformer TR1 and the mutual inductance of the transformer TR2, a difference occurs in the voltages of the filter capacitors C1 and C2.

Figure 2:
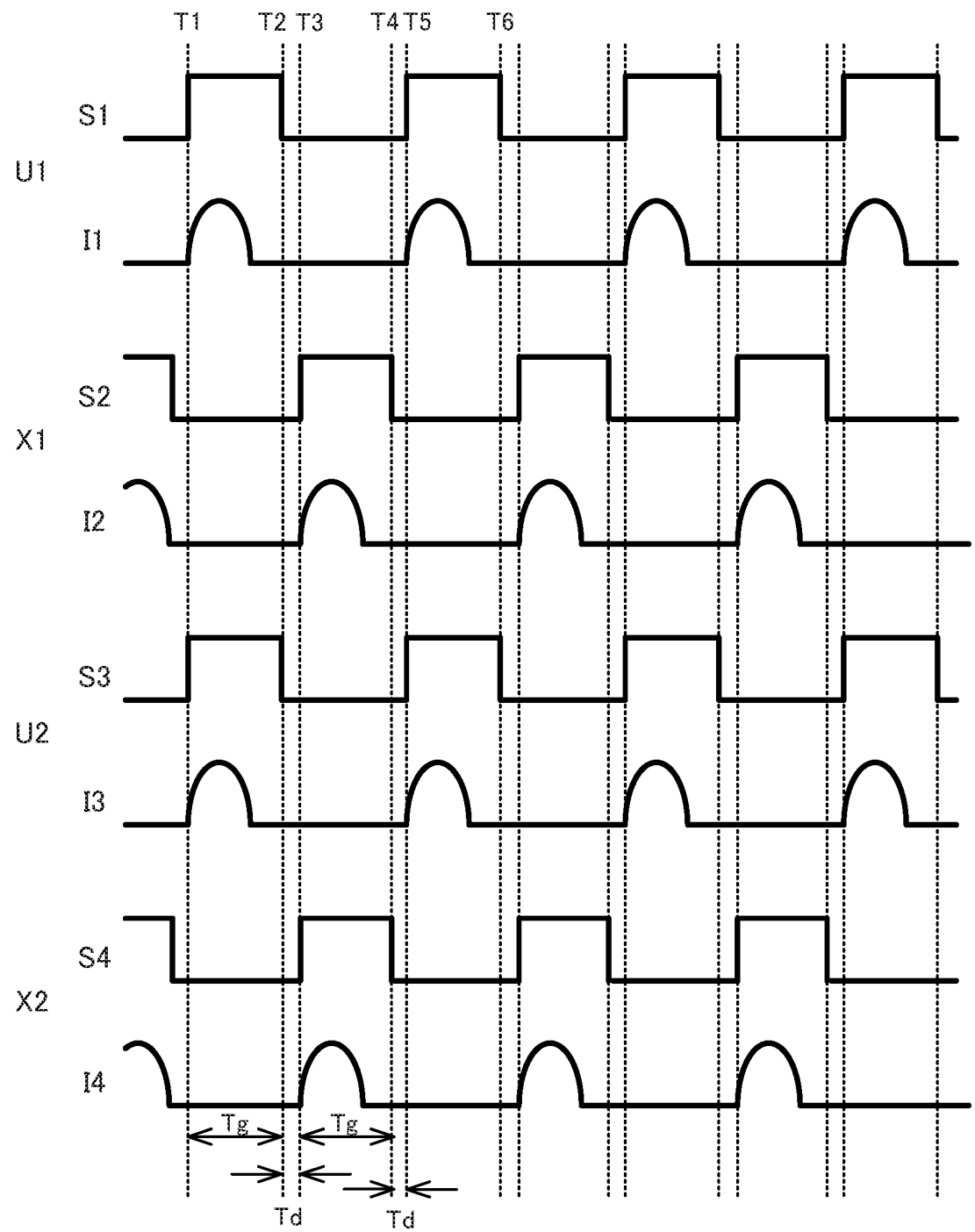
FIG. 2 is a chart illustrating an example of control signals and currents of switching elements in the embodiment.

The adjustment amount calculator 2 monitors voltages of the filter capacitors C1 and C2 detected by a non-illustrated voltage detector. Operation of the resonant power conversion device 1 is described next in the case in which the voltage difference of the filter capacitors C1 and C2 is so sufficiently small that the voltage difference of the filter capacitors C1 and C2 can be ignored. FIG. 2 is a chart illustrating an example of control signals and currents of switching elements in the embodiment. For the switching elements U1, X1, U2, and X2, the upper plots respectively indicate the control signal and the lower plots respectively indicate the current of the switching elements of U1, X1, U2, and X2. The controller 3 respectively sends the control signals S1, S2, S3, and S4 to the switching elements U1, X1, U2, and X2. The control signals S1, S2, S3, and S4 are pulse signals. The currents I1, I2, I3, and I4 respectively flow through the switching elements U1, X1, U2, and X2. The controller 3 outputs the control signals S1, S2, S3, and S4 such that the switching elements U1 and X1 are alternatingly ON, the switching elements U2 and X2 are alternatingly ON, the switching elements U1 and U2 turn ON at the same timing, and the switching elements X1 and X2 turn ON at the same timing. Taking frequency of the control signals S1, S2, S3, and S4 to be f, and taking dead time of the control signals S1, S2, S3, and S4 to be Td, pulse width Tg of the switching elements U1, X1, U2, and X2 is given by the Equation (3) below.

[Equation 3]

$$Tg = \frac{1}{2} \cdot \frac{1}{f} - Td \tag{3}$$

In the example of FIG. 2, the control signals S1 and S3 respectively sent to the switching elements U1 and U2 rise at a time T1, and fall at a time T2 that is Tg after the time T1. The control signals S2 and S4 respectively sent to the switching elements X1 and X2 rise at a time T3 upon passage of the dead time Td after the time T2, and fall at a time T4 upon passage of Tg after the time T3. The control signals S1 and S3 rise at a time T5 upon passage of the dead time Td after the time T4, and fall at a time T6 upon passage of Tg after the time T5. The controller 3 outputs the control signals S1, S2, S3, and S4, which are pulse signals that change in the aforementioned manner, and switches ON-OFF the switching elements U1, X1, U2, and X2. The dead time Td is determined beforehand in accordance with switching speed of the switching elements U1, X1, U2, and X2.

Figure 3:
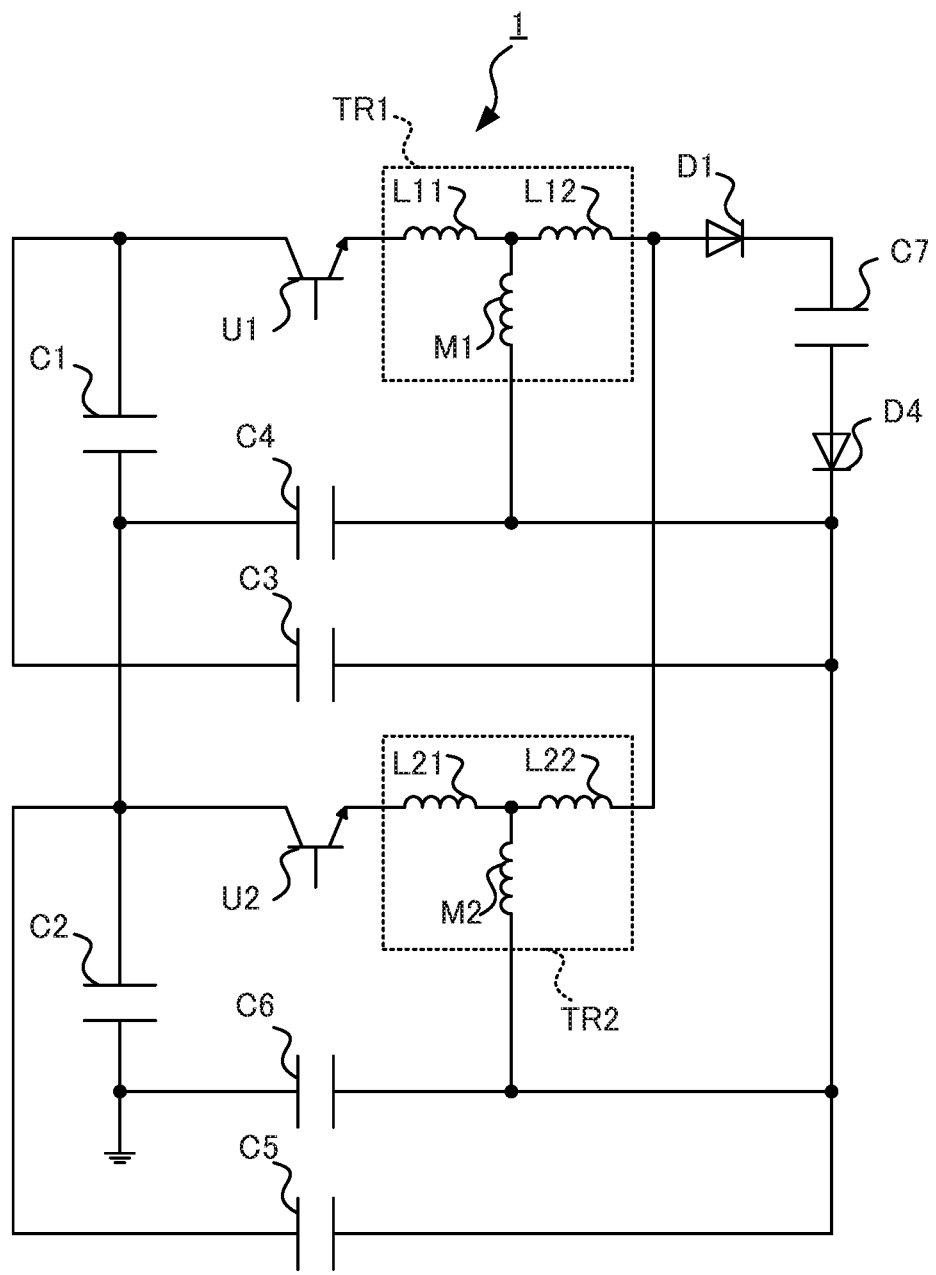
FIG. 3 is a diagram illustrating an example of an equivalent circuit of a main circuit of the resonant power conversion device according to the embodiment.

Operation of the resonant power conversion device 1 is described next in the case in which a voltage difference occurs in the filter capacitors C1 and C2 due to mismatching of the mutual inductances of the transformers TR1 and TR2. FIG. 3 is a diagram illustrating an example of an equivalent circuit of a main circuit of the resonant power conversion device according to the embodiment. FIG. 3 illustrates an equivalent circuit of the main circuit of the resonant power conversion device 1 in the case in which the switching elements U1 and U2 are in the ON state. The mutual inductance of the transformer TR1 is M1, and the mutual inductance of the transformer TR2 is M2. The secondary-side leakage inductance of the transformer TR1 is L12, and the secondary-side leakage inductance of the transformer TR2 is L22. As may be understood from the equivalent circuit illustrated in FIG. 3, the input voltage of the resonant power conversion device 1 undergoes voltage division by the mutual inductances M1 and M2, and is applied to the filter capacitors C1 and C2. An example is described below in which the input voltage of the resonant power conversion device 1 is 1,000V, M1 is 400 µH, and M2 is 600 µH. In this case, a voltage VC1 of the filter capacitor C1 is 400V as indicated by the below Equation (4). Further, a voltage VC2 of the filter capacitor C2 is 600V as indicated by the below Equation (5).

[Equation 4]

$$VC1 = 1000 \ [V] \cdot \frac{400 \ [\mu H]}{400 \ [\mu H] + 600 \ [\mu H]} = 400 \ [V] \tag{4}$$

[Equation 5]

$$VC2 = 1000 \ [V] \cdot \frac{600 \ [\mu H]}{400 \ [\mu H] + 600 \ [\mu H]} = 600 \ [V] \tag{5}$$

In the aforementioned manner, a peak value of the current of the switching element U1 is 1.5 times the peak value of the current of the switching element U2, a difference arises in the losses occurring in the switching elements U1 and U2, and a difference occurs in the life spans of the switching elements U1 and U2. In the same manner, a difference arises in the losses occurring in the switching elements X1 and X2, and a difference occurs in the life spans of the switching elements X1 and X2.

Figure 4:
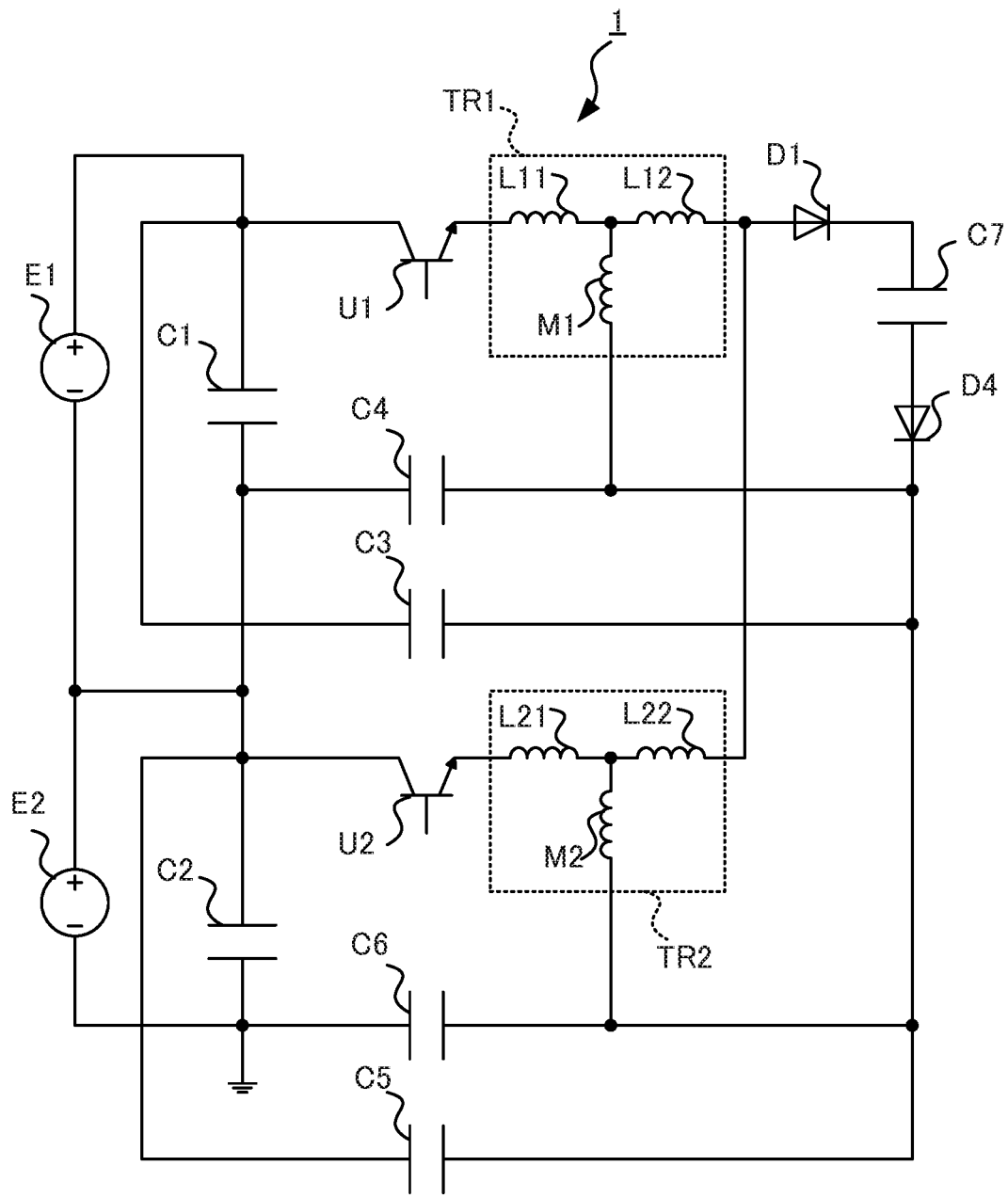
FIG. 4 is a diagram illustrating an example of another equivalent circuit of a main circuit of the resonant power conversion device according to the embodiment.

The resonant power conversion device 1 operation decreasing the voltage difference of the filter capacitors C1 and C2 is described below. The adjustment amount calculator 2, in accordance with the voltage difference of the filter capacitors C1 and C2 caused by the difference between the mutual inductances M1 and M2, calculates the adjustment amount indicating the delay time of the rise of the pulses of the control signals S1, S2, S3, and S4. The controller 3 delays the rise of the pulses of the control signals S1, S2, S3, and S4 in accordance with the adjustment amount, and outputs the delayed pulses to the switching elements U1, X1, U2, and X2. FIG. 4 is a diagram illustrating an example of another equivalent circuit of the main circuit of the resonant power conversion device according to the embodiment. This diagram is to be viewed similarly to FIG. 3. The input power supply of the resonant power conversion device 1 is indicated by the power supplies E1 and E2. In the case in which the voltage of the filter capacitor C1 is larger than the voltage of the filter capacitor C2, in the circuit illustrated in FIG. 4, the switching element U1 is turned ON, and the switching element U2 is turned OFF. When the switching element U2 is in the OFF state, due to the power supply E2, the filter capacitor C2 charges, and the voltage difference of the filter capacitors C1 and C2 decreases. The adjustment amount calculator 2 calculates the adjustment amount indicating the delay time of the rise of the control signal S3 to the switching element U2 relative to the rise of the control signal S1 to the switching element U1, the controller 3 generates and outputs the control signals S1 and S3 in accordance with the adjustment amount, and thus the voltage difference of the filter capacitors C1 and C2 decreases. In the same manner, the voltage difference of the filter capacitors C1 and C2 is decreased by delaying, relative to the rise of the control signal S2 with respect to the switching element X1, the rise of the control signal S4 with respect to the switching element X2.

In the case in which the voltage of the filter capacitor C1 is smaller than the voltage of the filter capacitor C2, in the circuit illustrated in FIG. 4, the switching element U1 is turned OFF, and the switching element U2 is switched ON. When the switching element U1 is in the OFF state, due to the power supply E1, the filter capacitor C1 charges, and the voltage difference of the filter capacitors C1 and C2 decreases. The adjustment amount calculator 2 calculates the adjustment amount indicating the delay time of the rise of the control signal S1 to the switching element U1 relative to the rise of the control signal S3 to the switching element U2, the controller 3 generates and outputs the control signals S1 and S3 in accordance with the adjustment amount, and thus the voltage difference of the filter capacitors C1 and C2 decreases. In the same manner, the voltage difference of the filter capacitors C1 and C2 is decreased by delaying, relative to the rise of the control signal S4 to the switching element X2, the rise of the control signal S2 to the switching element X1.

Figure 5:
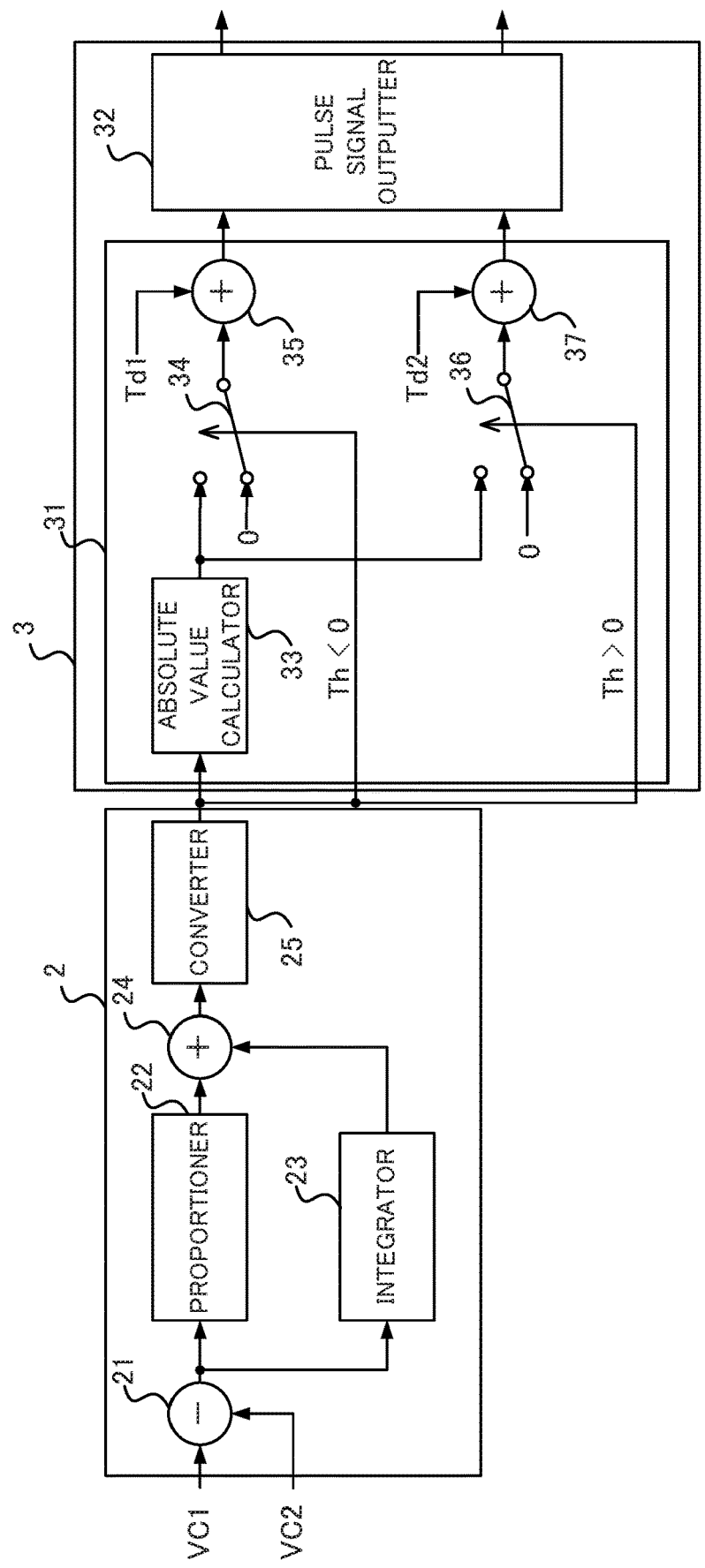
FIG. 5 is a block diagram illustrating an example configuration of an adjustment amount calculator and a controller according to the embodiment.

FIG. 5 is a block diagram illustrating an example configuration of the adjustment amount calculator and the controller according to the embodiment. The adjustment amount calculator 2 calculates the adjustment amount by performing proportional-integral (PI) control of the difference between the voltage VC1 of the filter capacitor C1 and the voltage VC2 of the filter capacitor C2. The voltages VC1 and VC2 are input to a subtractor included in the adjustment amount calculator 2. The subtractor 21 calculates a difference VC1−VC2 between the voltages VC1 and VC2, and outputs the calculated difference to a proportioner 22 and an integrator 23. The proportioner 22, on the basis of a proportional gain, outputs a result of performance of proportional control with respect to the output of the subtractor 21. The integrator 23, on the basis of an integral time constant and an integral gain, outputs a result of performance of integral control with respect to the output of the subtractor 21. An adder 24 adds the output of the proportioner 22 and the output of the integrator 23. A converter 25, in accordance with an inputted output of the adder 24, outputs an adjustment amount Th that is a ramp function, for example. The proportional gain, the integral time constant, the integral gain, and the ramp function are set appropriately on the basis of simulations or experiments using actual equipment. In the case in which VC1>VC2, the adjustment amount Th is a positive value, and in the case in which VC1<VC2, the adjustment amount Th is a negative value.

The controller 3 is equipped with: a dead-time setter 31 that sets the dead time in accordance with the adjustment amount outputted by the adjustment amount calculator 2, and a pulse signal outputter 32 that generates and outputs the control signals S1, S2, S3, and S4 in accordance with a reference signal acquired from a non-illustrated reference signal generator and the dead time set by the dead-time setter 31. An absolute value calculator 33 included in the dead-time setter 31 outputs the absolute value of the adjustment amount Th. The output of the absolute value calculator 33 and a set voltage having a value of zero are input respectively to two input terminals of the switch 34. In the case in which the adjustment amount Th is zero or positive, that is, in the case in which the voltage VC1 is greater than or equal to the voltage VC2, the set voltage is input to the adder 35. In the case in which the adjustment amount Th is negative, that is, in the case in which the voltage VC1 is less than the voltage VC2, the switch 34 switches such that the output of the absolute value calculator 33 is input to the adder 35. The adder 35 adds the output of the switch 34 to a default value Td1 of the dead time of the control signals S1 and S2 to the switching elements U1 and X1 and outputs the result of addition to the pulse signal outputter 32. That is, in the case in which the voltage VC1 is greater than or equal to the voltage VC2, the default value Td1 of the dead time of the control signals S1 and S2 is input to the pulse signal outputter 32. In the case in which the voltage VC1 is less than the voltage VC2, a value obtained by adding the absolute value of the adjustment amount Th to the default value Td1 of the dead time of the control signals S1 and S2 is input to the pulse signal outputter 32.

The output of the absolute value calculator 33 and the set voltage having a value of zero are input respectively to the two input terminals of the switch 36. In the case in which the output of the adjustment amount calculator 2 is zero or negative, that is, in the case in which the voltage VC2 is greater than or equal to the voltage VC1, the set voltage is input to the adder 37. In the case in which the adjustment amount Th is positive, that is, in the case in which the voltage VC2 is less than the voltage VC1, the switch 36 switches such that the output of the absolute value calculator 33 is input to the adder 37. The adder 37 adds the output of the switch 36 to a default value Td2 of the dead time of the control signals S3 and S4 to the switching elements U2 and X2, and outputs the result of addition to the pulse signal outputter 32. That is, in the case in which the voltage VC2 is greater than or equal to the voltage VC1, the default value Td2 of the dead time of the control signals S3 and S4 is input to the pulse signal outputter 32. In the case in which the voltage VC2 is less than the voltage VC1, the value obtained by adding the absolute value of the adjustment amount Th to the default value Td2 of the dead time of the control signals S3 and S4 is input to the pulse signal outputter 32.

The pulse signal outputter 32 generates the control signals S1, S2, S3, and S4 in accordance with the reference signal and the dead time set by the dead-time setter 31, and outputs the generated signals to the switching elements U1, X1, U2, and X2. In the case in which the voltage VC1 is less than the voltage VC2, the pulse signal outputter 32 delays the rise of the pulses of the control signals S1 and S2 to the switching elements U1 and X1 that are included in the power conversion circuit 11 connected in parallel to the filter capacitor C1. That is, the rise of the pulse of the control signal S1 is delayed to a time later than the rise of the pulse of the control signal S3. Further, the rise of the pulse of the control signal S2 is delayed to a time later than the rise of the pulse of the control signal S4. In the case in which the voltage VC1 is larger than the voltage VC2, the pulse signal outputter 32 delays the rise of the pulse of the control signals S3 and S4 to the switching elements U2 and X2 that are included in the power conversion circuit 12 connected in parallel to the filter capacitor C2. That is, the rise of the pulse of the control signal S3 is delayed to a time later than the rise of the pulse of the control signal S1. Further, the rise of the pulse of the control signal S4 is delayed to a time later than the rise of the pulse of the control signal S2.

Figure 6:
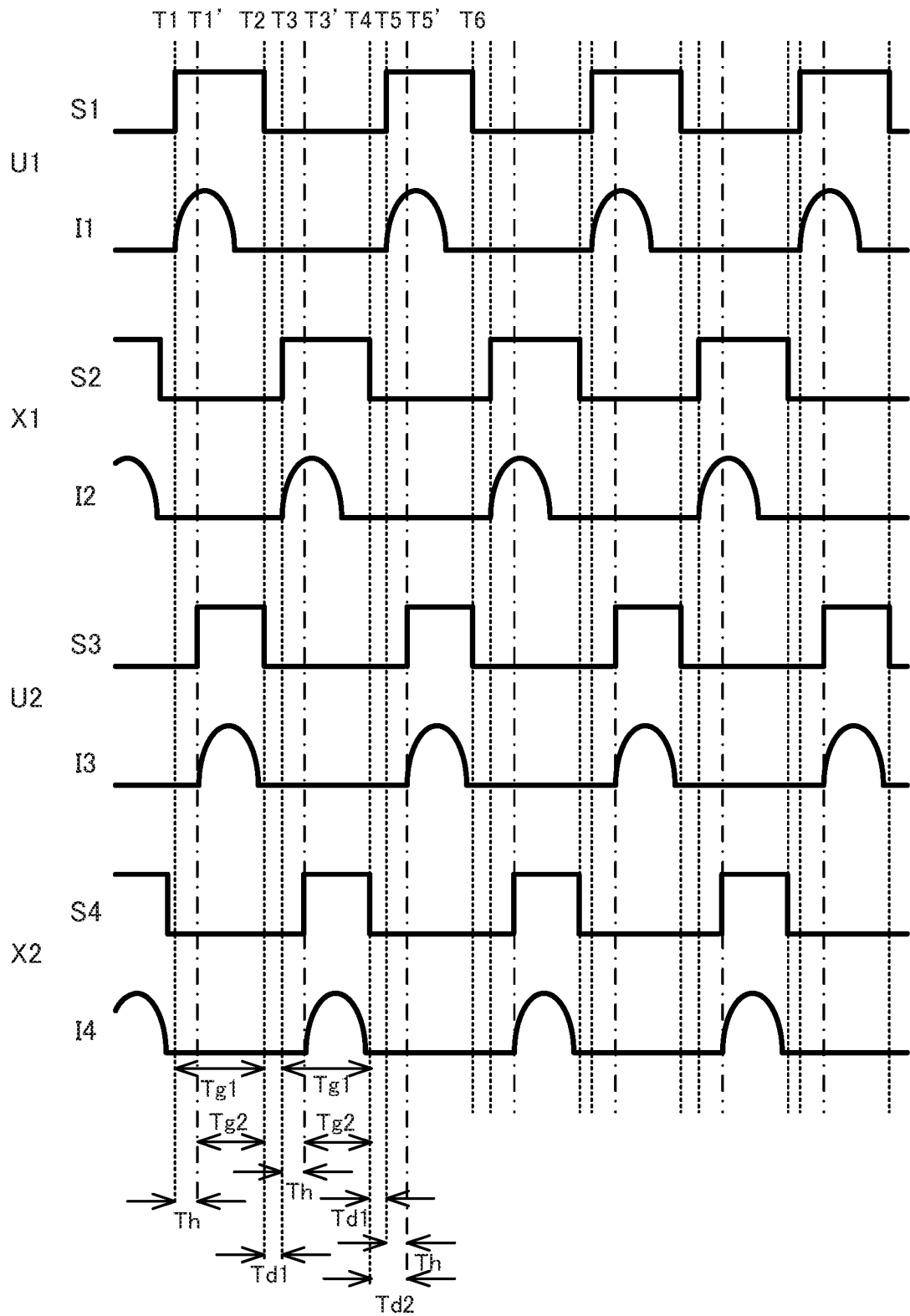
FIG. 6 is a chart illustrating another example of control signals and currents of switching elements in the embodiment.

FIG. 6 is a chart illustrating another example of the control signals and the currents of the switching elements in the embodiment. FIG. 6 illustrates an example of the control signals S1, S2, S3, and S4 and the currents of the switching elements U1, X1, U2, and X2 in the case in which the voltage VC1 is greater than the voltage VC2. In the example of FIG. 5, the control signal S1 to the switching element U1 rises at the time T1, and falls at the time T2 upon passage of Tg1 after the time T1. The control signal S3 to the switching element U2 rises at the time T1' upon passage of the adjustment amount Th after the time T1, and falls at the time T2 upon passage of Tg2 after the time T1'. The timings of the falls of the pulses of the control signals S1 and S3 are the same. The control signal S2 to the switching element X1 rises at the time T3 upon passage of the dead time Td1 after the time T2, and falls at the time T4 upon passage of Tg1 after the time T3. The control signal S4 to the switching element X2 rises at the time T3' upon passage of the adjustment amount Th after the time T3, and falls at the time T4 upon passage of Tg2 after the time T3'. The timings of the falls of the pulses of the control signals S2 and S4 are the same. The control signal S1 rises at the time T5 upon passage of the dead time Td1 after the time T4, and falls at the time T6 upon passage of Tg1 after the time T5. The control signal S3 rises at the time T5' upon passage of the adjustment amount Th after the time T5, that is, after passage of the dead time Td2 after the time T4, and falls at the time T6 upon passage of Tg2 after the time T5'. The controller 3 outputs the control signals S1, S2, S3, and S4 that are the pulse signals changed in the aforementioned manner. Due to the rise of the pulses of the control signals S2 and S4 in the aforementioned manner being delayed until later than the rise of the pulses of the control signals S1 and S3, the filter capacitor C2 is charged in the period of the adjustment amount Th, and the voltage difference of the filter capacitors C1 and C2 decreases.

Figure 7:
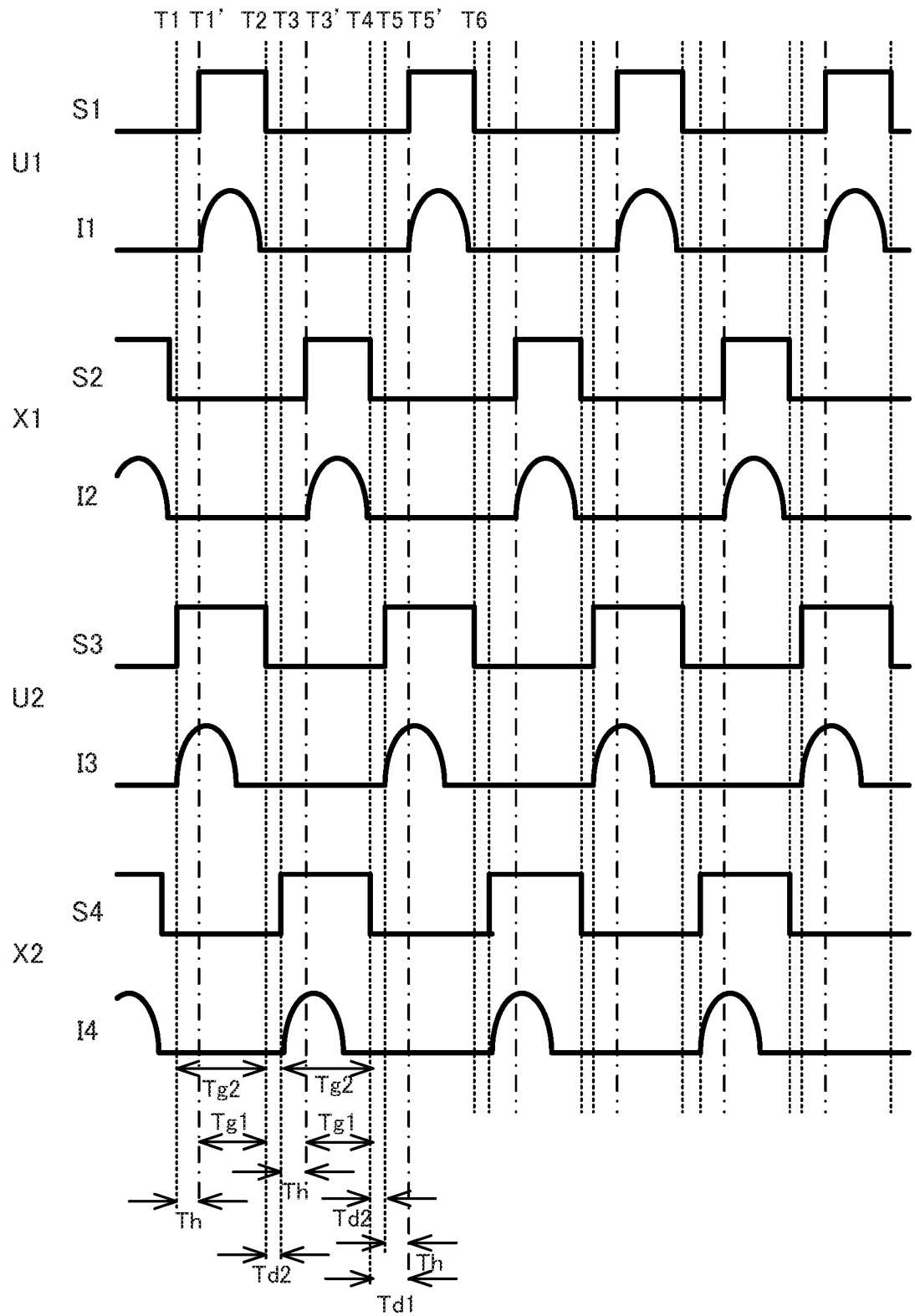
FIG. 7 is a chart illustrating yet another example of control signals and currents of switching elements in the embodiment.

FIG. 7 is a chart illustrating yet another example of the control signals and the currents of the switching elements in the embodiment. FIG. 7 illustrates an example of the control signals S1, S2, S3, and S4 and the currents of the switching elements U1, X1, U2, and X2 in the case in which the voltage VC1 is less than the voltage VC2. In the example of FIG. 7, the control signal S3 to the switching element U2 rises at the time T1, and falls at the time T2 upon passage of Tg2 after the time T1. The control signal S1 to the switching element U1 rises at the time T1' upon passage of the adjustment amount Th after the time T1, and falls at the time T2 upon passage of Tg1 after the time T1'. The timings of the falls of the pulses of the control signals S1 and S3 are the same. The control signal S4 to the switching element X2 rises at the time T3 upon passage of the dead time Td2 after the time T2, and falls at the time T4 upon passage of Tg2 after the time T3. The control signal S2 to the switching element X1 rises at the time T3' upon passage of the adjustment amount Th after the time T3, and falls at the time T4 upon passage of Tg1 after the time T3'. The timings of the falls of the pulses of the control signals S2 and S4 are the same. The control signal S3 rises at the time T5 upon passage of the dead time Td2 after the time T4, and falls at the time T6 upon passage of Tg2 after the time T5. The control signal S1 falls upon passage of the adjustment amount Th after the time T5, that is, at the time T6 after passage of the dead time Td1 after the time T4. The controller 3 outputs the control signals S1, S2, S3, and S4 that are the pulse signals changed in the aforementioned manner. Due to the rise of the pulses of the control signals S1 and S3 in the aforementioned manner being delayed until later than the rise of the pulses of the control signals S2 and S4, the filter capacitor C1 is charged in the period of the adjustment amount Th, and the voltage difference of the filter capacitors C1 and C2 decreases.

The adjustment amount calculator 2 may calculate the adjustment amount in a range set less than or equal to an upper limit value determined in accordance with the resonance period of the currents of the switching elements U1, X1, U2, and X2. The upper limit value can be determined by detecting waveforms of the currents of the switching elements U1, X1, U2, and X2 by simulation or experiments using actual equipment, and determining the upper limit value in accordance with the detected waveforms. In the case in which the rise of the pulse of the control signal S1 is delayed by just the upper limit value, for example, in accordance with the resonant period of the detected current waveform, the upper limit is determined such that the timing of the fall of the current of the switching element U1 is earlier than the timing of the fall of the pulse of the control signal S1. In this case, by determination of the adjustment amount for the control signal S1 in the range less than or equal to the upper limit value, when the control signal S1 falls, the current of the switching element U1 is small enough to be regarded as zero, thereby enabling zero current switching.

As described above, per the resonant power conversion device 1 according to the embodiment of the present disclosure, the rises of the pulses of the control signals S1, S2, S3, and S4 are delayed in accordance with the voltage difference of the filter capacitors C1 and C2, and thus the voltage difference of the filter capacitors C1 and C2 can be decreased. Due to the decrease in the voltage difference of the filter capacitors C1 and C2, the losses occurring in the switching elements U1, X1, U2, and X2 can be made equal, and the life spans of the switching elements U1, X1, U2, and X2 can be made equal. Further, the losses occurring in the transformers TR1 and TR2 can be made equal.

Figure 8:
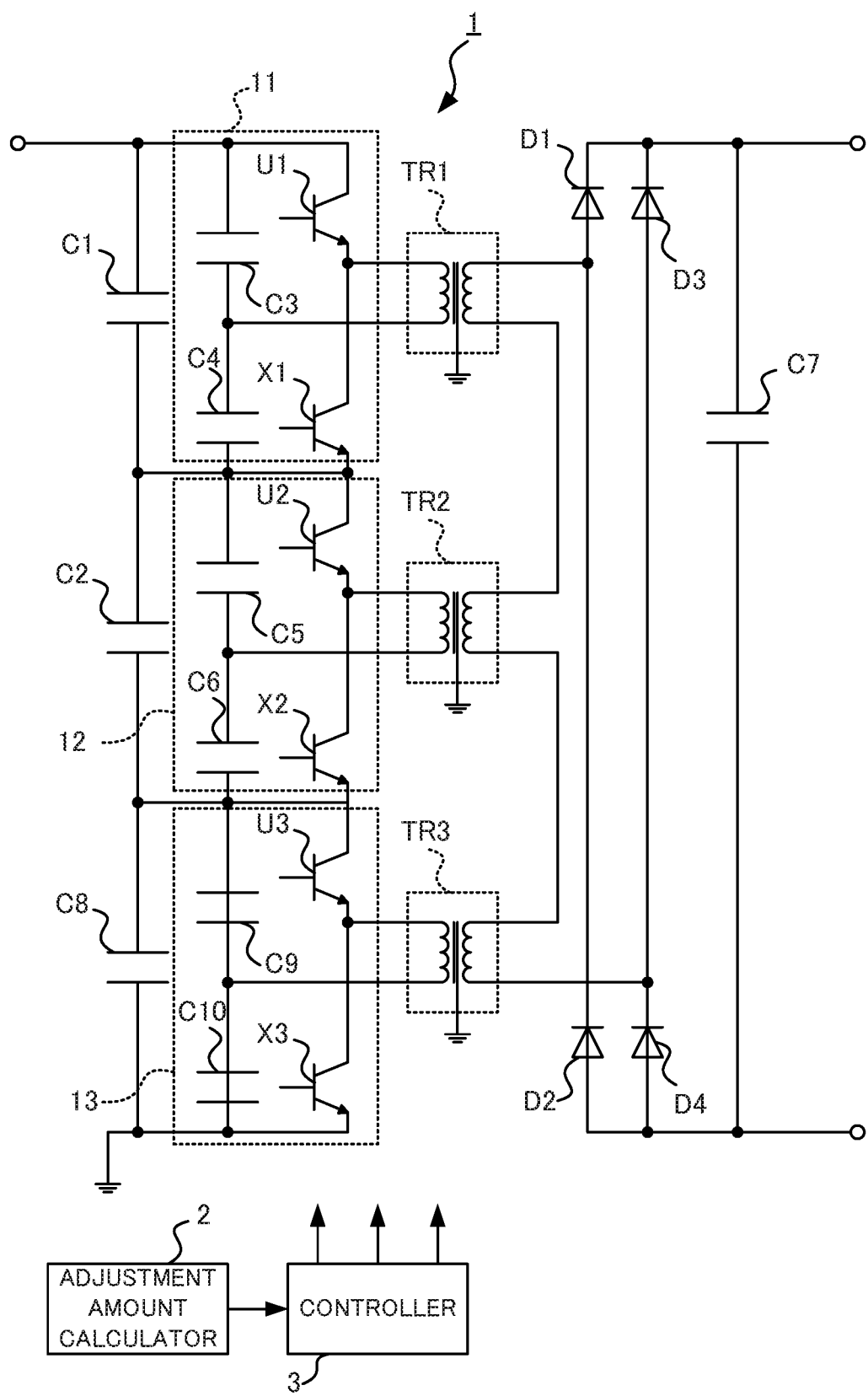
FIG. 8 is a block diagram illustrating another example configuration of the resonant power conversion device according to the embodiment.

The present disclosure is not limited to the above embodiment. The above described configuration of the resonant power conversion device 1 is an example. FIG. 8 is a block diagram illustrating another example configuration of the resonant power conversion device according to the embodiment. The resonant power conversion device 1 can be equipped with a freely-determined number of filter capacitors that is at least two, as well as with power conversion circuits and transformers. The resonant power conversion device 1 illustrated in FIG. 8 is equipped with filter capacitors C1, C2, and C8, power conversion circuits 11, 12, and 13, and transformers TR1, TR2, and TR3. The configuration of the power conversion circuit 13 is similar to the configuration of the power conversion circuits 11 and 12. The power conversion circuit 13 is equipped with series-connected capacitors C9 and C10 and series-connected switching elements U3 and X3, that are connected in parallel to the filter capacitor C8. One end of the primary side of the transformer TR3 is connected to a connection point of the resonant capacitors C9 and C10, and the other end is connected to a connection point of the switching elements U3 and X3. The secondary sides of the transformers TR1, TR2, and TR3 are connected in series. One end of the transformer TR1 is connected to the connection point of the D1 and D2 diodes. One end of the transformer TR3 is connected to the connection point of the D3 and D4 diodes.

An example is described below in which a difference occurs between the voltage VC1 of the filter capacitor C1, the voltage VC2 of the filter capacitor C2, and a voltage VC3 of the filter capacitor C8, for example, when each of VC1 and VC2 is less than VC3. The adjustment amount calculator 2 calculates the delay amount indicating the delay time of the rise of the pulses of the control signals to the switching elements U1 and X1 in accordance with the difference between VC1 and VC3, for example. Further, the adjustment amount calculator 2 calculates the delay amount indicating the delay time of the rise of the pulses of the control signals to the switching elements U2 and X2 in accordance with the difference between VC2 and VC3. The controller 3 delays, relative to the rises of the pulses of the control signals to the switching elements U3 and X3, the rises of the respective pulses of the control signals with respect to the switching elements U2 and X2 and the control signals to the switching elements U1 and X1, in accordance with the aforementioned delay amount.

Figure 9:
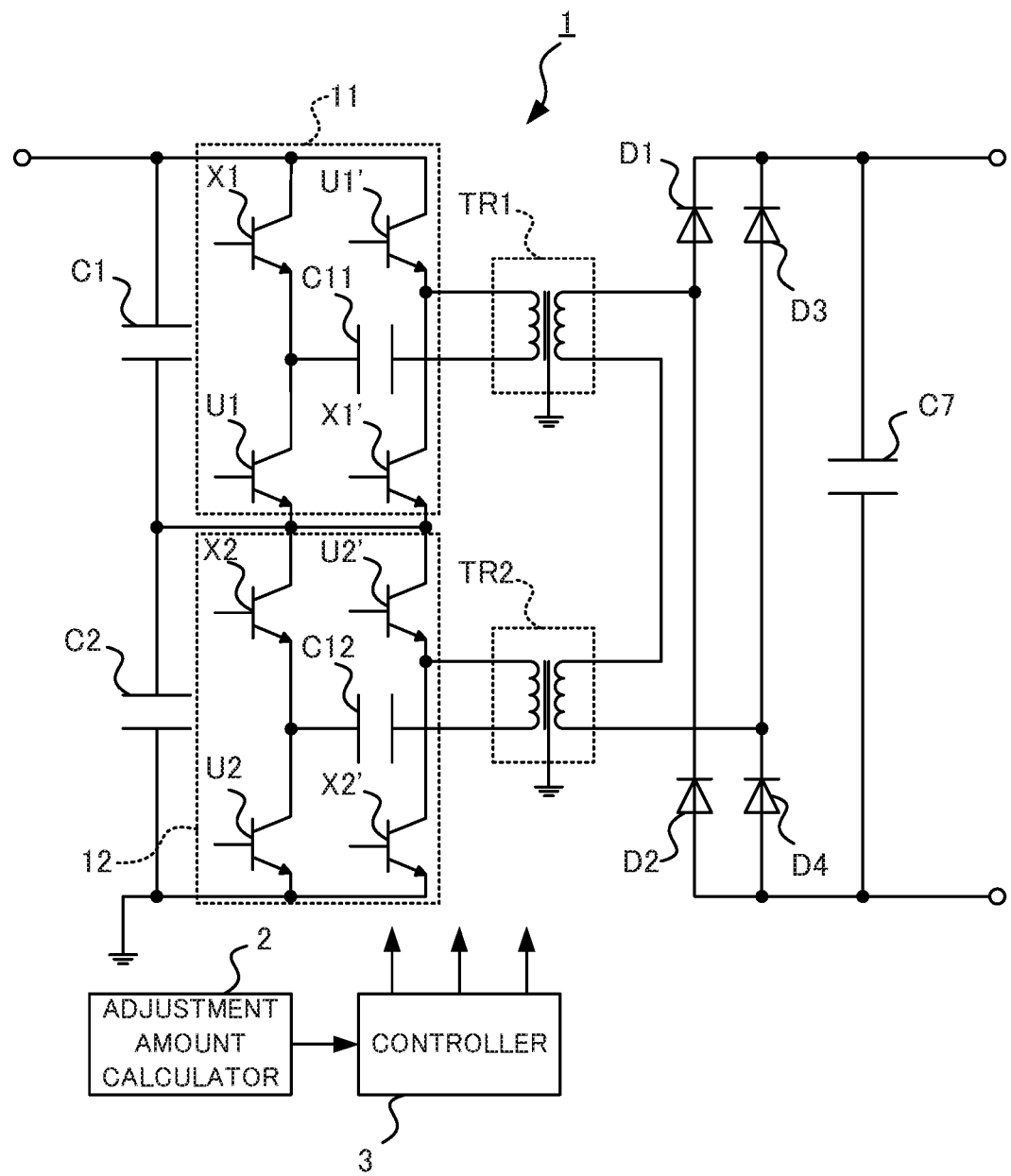
FIG. 9 is a block diagram illustrating yet another example configuration of the resonant power conversion device according to the embodiment.

FIG. 9 is a block diagram illustrating yet another example configuration of the resonant power conversion device according to the embodiment. The power conversion circuits 11 and 12 are not limited to half-bridge circuits, but rather are any freely selected resonant circuits. In the example of FIG. 9, the power conversion circuits 11 and 12 are full-bridge circuits. In FIG. 9, the power conversion circuit 11 is equipped with the series-connected switching elements X1 and U1 and series-connected switching elements U1' and X1' that are connected in parallel to the filter capacitor C1. One end of the transformer TR1 is connected to the connection point of the switching elements X1 and U1 via the resonant capacitor C11, and the other end is connected to a connection point of the switching elements U1' and X1'. The switching elements X1 and X1' are switched ON-OFF at the same timing. In the same manner, the switching elements U1 and U1' are switched ON-OFF at the same timing.

In FIG. 9, the configuration of the power conversion circuit 12 is the same as the configuration of the power conversion circuit 11. The power conversion circuit 12 is equipped with the series-connected switching elements X2 and U2 and series-connected switching elements U2' and X2' that are connected in parallel to the filter capacitor C2. One end of the transformer TR2 is connected to the connection point of the switching elements X2 and U2 via the resonant capacitor C12, and the other end is connected to a connection point of the switching elements U2' and X2'. The switching elements X2 and X2' are switched ON-OFF at the same timing. In the same manner, the switching elements U2 and U2' are switched ON-OFF at the same timing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Resonant power conversion device
2 Adjustment amount calculator
3 Controller
11, 12, 13 Power conversion circuit
21 Subtractor
22 Proportioner
23 Integrator
24, 35, 37 Adder
25 Converter
31 Dead-time setter
32 Pulse signal outputter
33 Absolute value calculator
34, 36 Switch
C1, C2, C7, C8 Filter capacitor
C3, C4, C5, C6, C9, C10, C11, C12 Resonant capacitor
D1, D2, D3, D4 Diode
E1, E2 Power supply
I1, I2, I3, I4 Current
L11, L21 Primary-side leakage inductance
L12, L22 Secondary-side leakage inductance
M1, M2 Mutual inductance
S1, S2, S3, S4 Control signal
TR1, TR2, TR3 Transformer
U1, U1', U2, U2', U3, X1, X1', X2, X2', X3 Switching element

The invention claimed is:

1. A resonant power conversion device comprising: a plurality of filter capacitors connected in series and disposed at an input side; a plurality of transformers in one-to-one correspondence with the plurality of filter capacitors, the plurality of transformers being connected in series at a secondary side; a plurality of power conversion circuits in one-to-one correspondence with the plurality of filter capacitors, to convert a direct current voltage to an alternating current voltage by inputting an input voltage applied to the plurality of filter capacitors, and output the alternating current voltage at a primary side of a transformer of the plurality of transformers, each power conversion circuit of the plurality of power conversion circuits having a resonant capacitor and a switching element; a controller to switch the switching element on or off by outputting a control signal that is a pulse signal to the switching element; and an adjustment amount calculator to calculate, in accordance with a voltage difference of the plurality of filter capacitors, an adjustment amount indicating a delay time of a rise of a pulse of the control signal to the switching element of one or more of the plurality of power conversion circuits, wherein the voltage difference of the plurality of filter capacitors is a difference in voltage values of the plurality of filter capacitors detected by a voltage detector, the difference occurring due to a lack of matching mutual inductances of the plurality of transformers connected in series at the secondary side, the controller delays, in accordance with the adjustment amount, the rise of the pulse of the control signal to the switching element included in the one or more of the plurality of power conversion circuits.

2. The resonant power conversion device according to claim 1, wherein the adjustment amount calculator calculates the adjustment amount in a range less than or equal to an upper limit determined in accordance with a resonant period of a current of the switching element.

3. The resonant power conversion device according to claim 2, wherein the adjustment amount calculator calculates, in accordance with the voltage difference, the adjustment amount by performing proportional-integral control of the voltage difference of the filter capacitors.

4. The resonant power conversion device according to claim 3, wherein the plurality of filter capacitors are two filter capacitors, the plurality of transformers are two resonant transformers, the plurality of power conversion circuits are two power conversion circuits, the resonant capacitor of the power conversion circuit are two resonant capacitors connected in series, the switching element of the power conversion circuit are two switching elements connected in series, the power conversion circuit is a half-bridge circuit including, and connecting in parallel to one filter capacitor of the plurality of filter capacitors, (i) the two resonant capacitors connected in series and (ii) the two switching elements connected in series, one end of the primary side of the transformer is connected to a connection point of the two resonant capacitors, and another end is connected to a connection point of the two switching elements, and upon the voltage difference occurring between the two filter capacitors, the controller, in accordance with the adjustment amount, causes delay of the rise of the pulse of the control signal to the switching element of the power conversion circuit connected in parallel to the filter capacitor having a lower voltage.

5. The resonant power conversion device according to claim 2, wherein the plurality of filter capacitors are two filter capacitors, the plurality of transformers are two resonant transformers, the plurality of power conversion circuits are two power conversion circuits, the resonant capacitor of the power conversion circuit are two resonant capacitors connected in series, the switching element of the power conversion circuit are two switching elements connected in series, the power conversion circuit is a half-bridge circuit including, and connecting in parallel to one filter capacitor of the plurality of filter capacitors, (i) the two resonant capacitors connected in series and (ii) the two switching elements connected in series, one end of the primary side of the transformer is connected to a connection point of the two resonant capacitors, and another end is connected to a connection point of the two switching elements, and upon the voltage difference occurring between the two filter capacitors, the controller, in accordance with the adjustment amount, causes delay of the rise of the pulse of the control signal to the switching element of the power conversion circuit connected in parallel to the filter capacitor having a lower voltage.

6. The resonant power conversion device according to claim 1, wherein the adjustment amount calculator calculates, in accordance with the voltage difference, the adjustment amount by performing a proportional-integral control of the voltage difference of the plurality of filter capacitors.

7. The resonant power conversion device according to claim 3, wherein the plurality of filter capacitors are two filter capacitors, the plurality of transformers are two resonant transformers, the plurality of power conversion circuits are two power conversion circuits, the resonant capacitor of the power conversion circuit are two resonant capacitors connected in series, the switching element of the power conversion circuit are two switching elements connected in series, the power conversion circuit is a half-bridge circuit including, and connecting in parallel to one filter capacitor of the plurality of filter capacitors, (i) the two resonant capacitors connected in series and (ii) the two switching elements connected in series, one end of the primary side of the transformer is connected to a connection point of the two resonant capacitors, and another end is connected to a connection point of the two switching elements, and upon the voltage difference occurring between the two filter capacitors, the controller, in accordance with the adjustment amount, causes delay of the rise of the pulse of the control signal to the switching element of the power conversion circuit connected in parallel to the filter capacitor having a lower voltage.

8. The resonant power conversion device according to claim 1, wherein the plurality of filter capacitors are two filter capacitors, the plurality of transformers are two resonant transformers, the plurality of power conversion circuits are two power conversion circuits, the resonant capacitor of the power conversion circuit are two resonant capacitors connected in series, the switching element of the power conversion circuit are two switching elements connected in series, the power conversion circuit is a half-bridge circuit including, and connecting in parallel to one filter capacitor of the plurality of filter capacitors, (i) the two resonant capacitors connected in series and (ii) the two switching elements connected in series, one end of the primary side of the transformer is connected to a connection point of the two resonant capacitors, and another end is connected to a connection point of the two switching elements, and upon the voltage difference occurring between the two filter capacitors, the controller, in accordance with the adjustment amount, causes delay of the rise of the pulse of the control signal to the switching element of the power conversion circuit connected in parallel to the filter capacitor having a lower voltage.

* * * * *